(12) United States Patent
Killion (10) Patent No.: US 6,237,442 B1
(45) Date of Patent: *May 29, 2001

(54) HIGH VALUE STATIC UNBALANCE-TYPE BALANCE SHAFTS

(75) Inventor: David L. Killion, Clarkston, MI (US)

(73) Assignee: Simpson Industries, Inc., Plymouth, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/227,952

(22) Filed: Jan. 11, 1999

Related U.S. Application Data (63) Continuation-in-part of application No. 08/677,085, filed on Jul. 9, 1996, now Pat. No. 5,857,388.
(60) Provisional application No. 60/075,127, filed on Feb. 14, 1998.

(51) Int. Cl.[7] ................ F16C 3/20; F02B 75/06
(52) U.S. Cl. .......................... 74/603; 123/192.2
(58) Field of Search ............ 74/603, 604, 591; 123/192.2, 192.1

(56) References Cited

U.S. PATENT DOCUMENTS

| | | |
|---|---|---|
| 4,617,885 | 10/1986 | Oshiro et al. . |
| 4,741,303 | 5/1988 | Kronich . |
| 4,819,505 | 4/1989 | Takubo et al. . |
| 5,174,257 | 12/1992 | Ozawa . |
| 5,230,311 | 7/1993 | Kuhn et al. . |
| 5,253,547 | 10/1993 | Yoneyama et al. . |
| 5,483,932 | 1/1996 | Friedman et al. . |
| 5,535,643 | 7/1996 | Garza . |
| 5,857,388 * | 1/1999 | Killion et al. ............... 74/603 |

* cited by examiner

Primary Examiner—Mary Ann Green
(74) Attorney, Agent, or Firm—Artz & Artz, P.C.

(57) ABSTRACT

A static unbalance-type balance shaft for rotating machinery such as vehicle engines includes a bearing surface adjacent the other end. The balance shaft includes a balance weight adjacent the first end and a connector portion connecting the balance weight to the other end. The connector portion has a cross-section with at least one recessed surface thereby minimizing the mass or weight of the balance shaft and optimize the material of the balance shaft.

10 Claims, 9 Drawing Sheets

HIGH VALUE STATIC UNBALANCE-TYPE BALANCE SHAFTS

CROSS-REFERENCE TO RELATED APPLICATIONS

The present application is a continuation-in-part of U.S. application Ser. No. 08/677,085, filed Jul. 9, 1996, entitled, "Balance Shafts Having Minimal Mass", which has now issued as U.S. Pat. No. 5,857,388, and also claims priority from U.S. Provisional Patent Application Serial No. 60/075,127, filed Feb. 14, 1998, entitled "Low Mass Balance Shafts."

TECHNICAL FIELD

The present invention relates to balance mechanisms for rotating machinery, particularly balance shafts for multicylinder internal combustion engines which exhibit shaking forces and/or rotating imbalance couples.

BACKGROUND ART

Balance shafts are commonly used to reduce or cancel shaking forces and/or vibrations which result from residual imbalances inherent in the design architecture of machinery with rotating parts or mechanisms, such as motors. These balance shafts are sometimes called "counterbalance" shafts.

Balance shafts are particularly valuable when operator or passenger comfort and freedom from noise and vibration-related fatigue or distraction are desired, as in the case of motor vehicles such as automobiles, motorcycles, and the like. It is also advantageous to minimize vibration from the standpoint of equipment reliability. Where vibrations are reduced, the size, mass and/or complexity of the mounting structures can often also be reliably reduced, thus potentially reducing cost.

With multicylinder motor vehicle engines, the inline four-cylinder engines and 90-degree V-6 engine configurations are favored in automotive use today due to their space efficiency and cost. Both of these engine architectures benefit from balance shafts, although for different reasons and vibratory characteristics, and thus requiring distinctly different balance shaft arrangements.

Balance shafts for inline four-cylinder engines typically are paired to rotate in opposite directions at twice the engine speed. The two balance shafts are timed to cancel each other's lateral shaking forces while opposing the vertical secondary shaking forces that are typical with this type of engine. Each shaft produces a single, or "static," rotating unbalance force, which taken together with its mating shaft's rotating unbalance force, produces a resultant vertical shaking force which most effectively is located centrally among the bank of cylinders. These static unbalance type shafts are shown, for example, in U.S. Pat. No. 4,819,505.

Other engines, such as 90-degree V-6 engines (i.e., six-cylinder engine with two banks of three cylinders spaced 90-degrees apart), produce resultant imbalance forces in the form of a crankshaft-speed rotating couple. These engines benefit from a single balance shaft with two balance "weights", or masses, on opposite sides of its axis of rotation, but spaced apart axially so as to have a dynamic imbalance providing a rotating couple. The couple produced by the balance shaft is designed to oppose or cancel that of the engine when the shaft is rotated at crankshaft speed and in the opposite direction to the crankshaft. The location of this "rotating couple"-type shaft relative to the engine is not critical so long as its axis of rotation parallels that of the crankshaft, since the output of the balance shaft is a pure couple or torque on the crankcase.

Balance shafts of both types frequently incorporate an elongated support member, or shaft, which provides a structural connection between the balance weights, in the case of rotating couple-type shafts, or between the centrally located balance weight(s) and a driving member, in the case of the static unbalance-type shaft. The elongated support member is typically subjected to both torsion and bending loads, and thus must be substantial enough to fulfill structural requirements. Since the mass of the elongated support member is largely "dead weight" and has little, if any, contribution to unbalance, its mass can be reduced in applications where overall mass is a factor in product cost and/or operating efficiency. These elongated support members or shafts typically have a circular cross-section. This circular section represents a structurally inefficient distribution of material that causes the components and their support structures to be more massive and often more costly than necessary.

The room or space for placement of balance shafts in the engine is typically small or limited. Balance shafts usually are constrained to operate within specified radii, whether to clear mating parts or to enable installation. Thus, efficient material usage typically motivates a balance weight cross-sectional shape that is, except for elongated support member intersection areas, "circular segment" in shape, i.e. the area between a radius and a chord. The radius of such a shape represents the clearance boundary beyond which the balance shaft cannot extend without risk of unwanted contact. The chord represents a locus of constant contribution to unbalance within the section, placing elements of mass equidistant from the axis of rotation, with regard to the ability of the mass element to generate centrifugal force in a particular direction, i.e., when viewed from a direction normal to the desired direction of unbalance force.

Typically, the "circular segment" shape of the balance weights are constant along their lengths. This enables easy calculation of their unbalance value from a design standpoint. However, this shape also results in inefficient distribution of material in the case of shafts with balance weights which create a rotating couple, or dynamic imbalance, thus causing components and their support structures to be more massive and thus also often more costly than necessary.

Space constraints sometimes preclude the placement, within the inline four-cylinder type engine and in conjunction with appropriate structural support, of balance weights in a manner that results in the resultant vertical shaking force being located centrally among the bank of cylinders as desired. In this situation, an unwanted pitching couple is created as a result of the axial distance between the engine's vertical shaking force and the balance shafts' resultant vertical shaking force, unless additional balance weights can be added to create rotating couple, or dynamic, unbalance within each shaft that will act to cancel this pitching couple. Such dynamic balance, when added to a static unbalance-type shaft can be seen to effectively relocate the plane of static unbalance to the new axial location where the sum of the moments of unbalance, or dynamic unbalance, within the shaft itself is zero. Any such combination of static and dynamic unbalance within a shaft can thus be characterized by an amount of pure static unbalance at an effective location or plane hereafter referred to as its "Effective Plane of Static Unbalance", or "EPSUB", about which the sum of moments of unbalance is zero.

The ideal application of balance shafts to inline four cylinder engines will locate the shafts' EPSUB at the axial center of the four cylinders, such that no pitching couple is created by an offset between the engine's shaking force and the balance shafts' shaking force, or in other words the sum of shaking force moments about the engine's axial center is zero. Where space constraints prevent this ideal full cancellation, the resulting residual shaking force may be located optimally by similar EPSUB methodology so as to most appropriately distribute the residual shaking force among engine mounts using appropriate noise, vibration and harshness minimization criteria.

Manufacturing cost consideration often force design compromises between ideal bearing configurations and ideal balance weight configurations. For example, it is common to use a larger than optimum (for friction losses, heat generation, etc.) bearing journal diameter in conjunction with a balance weight clearance boundary radius that is smaller than optimum (for unbalance creation without undue material usage) to enable axial installation (or "end loading") of the balance weight through the bearing bore, rather than incur the manufacturing complexity and cost associated with the split housing type bearings required to place an ideal configuration bearing in the midst of two larger radius balance weights that are symmetrically arrayed about the engine's center bulkhead.

The common method for providing for bearing journal diameter(s) smaller than balance weight radius without requiring split housing type bearings, namely fastening weights to a shaft after inserting the shaft through its bearing(s), is also complex, and thus also costly to manufacture, as well as being heavier than necessary.

There exists, therefore, potential for improvement in reducing manufacturing cost and solving space constraint problems, while managing the issues of drive system noise, bearing reliability, bearing drag, and overall weight in a manner that maximizes product value to the customer in the use of static unbalance balance shafts.

SUMMARY OF THE INVENTION

It is the object of the present invention to provide improved balance shafts for rotating machinery such as motor vehicle engines by enabling balance shaft design configurations which:

1.) result in lighter weight, and thus also potentially lower cost, by means of improved utilization of material in the elongated support member areas of the component for given load conditions;
2.) are stronger, having greater factor of safety for a given material usage, by means of improved utilization of material in the elongated support member areas of the component;
3.) contribute to increased bearing life due to the reduced bearing journal tilt angles that result from increased stiffness (resistance to bending under centrifugal loads) for a given material usage, by means of improved utilization of material in the elongated support member areas of the component;
4.) exhibit increased stiffness (resistance to bending under centrifugal loads) by means of improved utilization of material in the elongated support member areas of the component, with the associated benefit of reduced bearing journal tilt and thus potentially increased operating efficiency by means of smaller, and thus lower drag, bearing sizes;
5.) result in lighter weight and thus also potentially lower cost by means of improved utilization of material in the balance weight areas of shafts which create a rotating couple;
6.) reduce parasitic power loss by means of reduced "windage", or drag from air resistance, due to the reduced "frontal area" and bluntness of smaller, more efficiently shaped balance weights which create a rotating couple;
7.) reduce gear size and cost requirements as needed to achieve quiet operation through elimination of need to counteract the effects of unwanted operating deflections, which also influence bearing size requirements and thus cost;
8.) minimize bearing drag, which increases as the cube of bearing journal diameter, which in turn is driven by considerations of journal tilt under unbalance loads, with tilt magnitude being a function of shaft stiffness and the distribution of unbalance-creating material; and/or
9.) reduce manufacturing cost while meeting space constraints without inappropriate penalties to functional priorities of assuring bearing reliability, minimizing drive system noise, minimizing frictional losses, and minimizing overall weight.

The present invention enables the above object to be achieved by providing design methods and structures which result in improved balance shaft configurations, having reduced friction, and potentially reduced weight and/or manufacturing cost, with improved operating shapes under centrifugal bending loads, with potential attendant benefits of improved bearing reliability. Reduced weight can allow for subsequent weight reductions in associated support structures of the engine or vehicle.

In accordance with one embodiment of the present invention, the cross-sectional shape of the elongated support member or shaft, hereafter referred to as the "connector portion", between the balance weight(s) and the driving means of the static unbalance-type balance shaft, is formed in an optimized manner to minimize material usage while maintaining required bending stiffness, torsional stiffness, and safe levels of mechanical stress. The cross-section of the connector portion is shaped substantially like an "I-beam" with recessed or concave portions. This improves the ratio of section modulus to mass in the direction of the centrifugal loads, which in turn reduces the peak stress for a given material usage. Optimization of the connector portion may involve tapering, such that the "I-beam" varies in section along its length to address the variation in bending moment along its length.

As to another embodiment of the present invention, namely balance shafts with balance weights that create a rotating couple, one of the surfaces on each of the balance weights of the shaft is preferably shaped as a hyperbolic curve or an approximation thereof. The hyperbolic curve represents the locus of constant contribution to the unbalance couple produced by the shaft. There is a unique and preferred hyperbolic curve for each combination of unbalance value and balance weight clearance boundary conditions.

The cross-sectional shape of the connector portion between the balance weights of the static with rotating couple-type balance shaft is also formed in an optimized manner to minimize the material usage. The cross-section of the connector section is shaped substantially like an "I-beam" with recessed or concave portions. This improves the ratio of section modulus to mass in the direction of the centrifugal loads, which in turn reduces the peak stress for a given material usage.

Still further embodiments of the present invention provide improved static unbalance-type balance shafts, some with counterweights which overhang one of the bearing journals, and some with a combination of static unbalance and rotating couple-type configurations. The static unbalance-type balance shafts reduce material volume while improving operating deflection shape for the benefit of bearing reliability and/or gear noise and/or gear size and cost requirements necessary for quiet high speed operation by means of elongating balance weights from their typical rectangular side view proportions, in conjunction with longitudinal direction tapering of their (sectionally substantially chordal) inner surfaces. The elongation of the more effective (toward unbalance creation) outer portion (near clearance boundary radius, when viewed normal to direction of unbalance and axis of rotation) of the balance weights in conjunction with longitudinal tapering of the inner surfaces to maintain equivalent unbalance value serves to reduce mass, while increasing bending stiffness, in the case of the balance weight(s) between journals, and while potentially reducing bearing journal tilt under high speed unbalance loads of the "outrigger" bearing and its adjacent drive means, in the case of the overhung balance weight. To the extent that the moment of unbalance, about the length centerline of the principal bearing, of the overhung balance weight exceeds that of the balance weight between support bearings, the principal bearing is used as a fulcrum to offset the bending deflection of the shaft between bearings, to the potential straightening, under high speed operating loads, of the outrigger journal and its adjacent drive means, which can be of critical importance in the maintenance of the theoretical, or undeflected, helical contact ratio of drive gears and/or coupling gears as required for quiet operation.

If helical gearsets are not operated in high states of parallelism, i.e., freedom from errors due to manufacturing tolerances and operating deflections, the (theoretically) line contact upon which helical, and thus total, contact ratios of gearsets depend is reduced to (theoretically) point contact at the edges of the gears. To the extent gear faces are crowned to accommodate non-parallelism, the (theoretically) line contact is reduced to (theoretically) point contact anyway, to the effective loss of helical contact ratio and thus total contact ratio.

Journal tilt magnitudes are also a design consideration in the optimization of support bearings, with plain, or journal-type bearings especially susceptible to edge loading as a principal cause of seizure failures. Symmetry of balance weight distribution about a principal load carrying journal has been the traditional approach in the effort to minimize journal tilt, but the reality of high speed operating deflections as predicted by computer simulation such as Finite Element Analysis (FEA) often reveals that this symmetry approach fails to achieve the intended results because of failure to account for the effects of shaft or connector portion stiffness between bearings.

A preferred embodiment of the present invention provides for the manufacturing simplicity and cost benefits of axial assembly of one-piece, two-journal balance shafts to unsplit housing bearings, along with the friction loss benefits of bearings which can be of ideal size and configuration. Challenging space constraints are potentially also met with fewer compromises to clearance boundary radius, by locating static unbalance-type shafts which incorporate dynamic unbalance (to effect the appropriate EPSUB location at, or near, the central bulkhead of an inline four cylinder engine), in either the front or rear half of the engine. Low mass technology disclosed herein and in original U.S. application Ser. No. 08/677,085 can be utilized to minimize the shaft weight despite inclusion of the added dynamic unbalance which eliminates the necessity of split housing type bearings by eliminating the need to distribute unbalance mass on both sides of the principal (engine center bulkhead area) bearing journal.

Other benefits, features and advantages of the present invention will become apparent from the following written description of the invention, when taken in accordance with the appended claims and accompanying drawings.

BEST MODE(S) FOR CARRYING OUT THE INVENTION

Preferred embodiments of the present invention are shown in the drawings. The present invention particularly relates to improved static unbalance-type balance shafts, which are shown in FIGS. 1–4 and FIGS. 22–28 of the drawings, and rotating couple-type balance shafts, which are shown in FIGS. 5–21 of the drawings.

Figure 1:
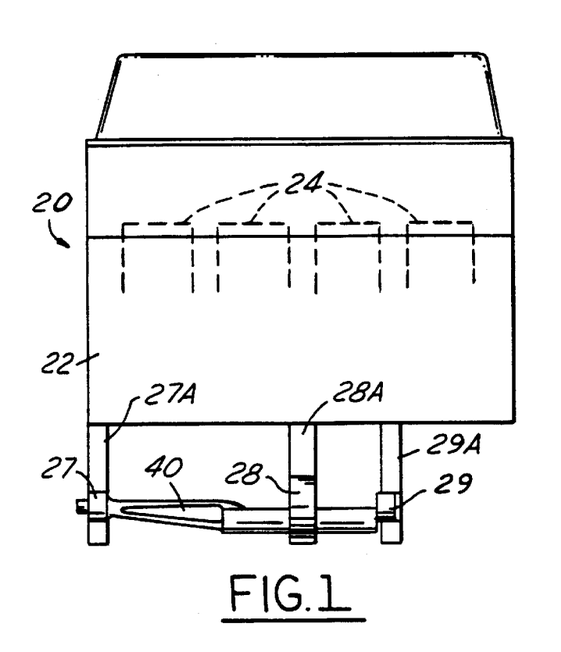
FIG. 1 is a side view of an inline four-cylinder engine incorporating two static unbalance-type shafts.
Figure 2:
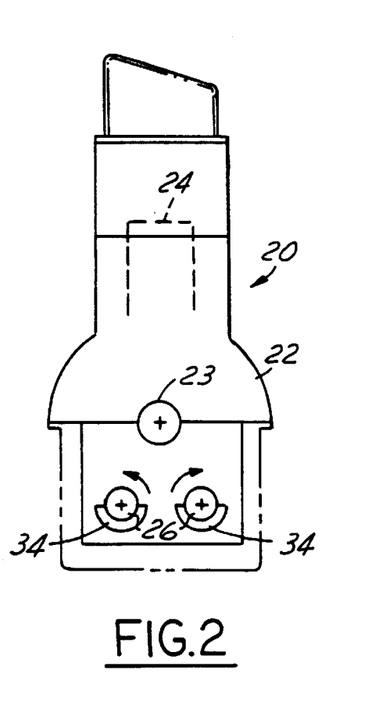
FIG. 2 is a front view of the engine shown in FIG. 1.

FIGS. 1 and 2 show the side and front views, respectively, of an inline four-cylinder automobile engine 20. The engine has an engine block 22 and a crankshaft 23 which is rotated by the rods connected to the pistons 24 in the engine. A pair of balance shafts 26 is used to reduce or cancel shaking forces and/or vibration caused by the movement of the reciprocating components in the engine 20. The balance shafts 26 are static unbalance-type shafts and each produces a single unbalanced force. The two balance shafts 26 cancel each others' lateral shaking forces, while opposing the vertical secondary shaking forces that are caused by the engine 20.

Each of the balance shafts is typically held in position by bearings 27, 28 and 29. These bearings are held in bearing seats 27a, 28a and 29a, respectively, as shown in FIG. 1. Although the location and support for only one of the two balance shafts 26 are shown in FIG. 1, the second balance shaft of the pair of balance shafts for the engine 20 is positioned and held in place in substantially the same manner.

Figure 3:
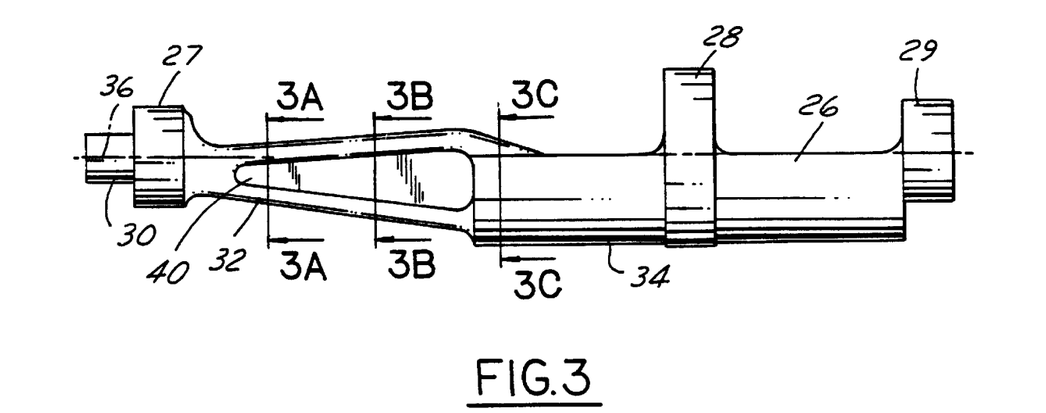
FIG. 3 is a side view of a static unbalance-type shaft for use in an inline four-cylinder engine.
Figure 3C:
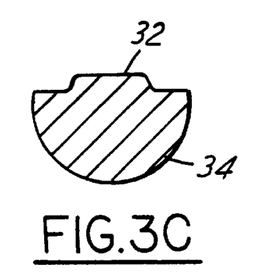
Figure 4:
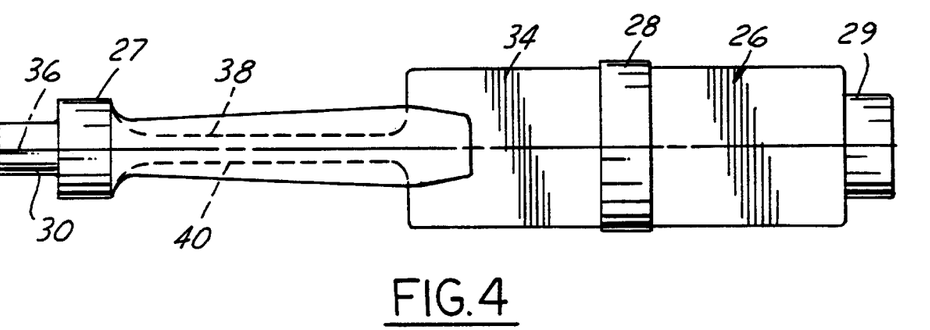
FIG. 4 is a top view of the static unbalance-type shaft shown in FIG. 3.

FIGS. 3 and 4 show the side and top views, respectively, of one of the two static unbalance-type balance shafts 26. Each of the balance shafts 26 has a nose or drive shaft 30 at one end, a connector portion 32 and a balance weight 34. The connector portion 32 is positioned between bearing surface 27 and one end of the balance weight 34, while bearing surface 29 is positioned at the opposite end of the balance weight. Bearing surface 28 is positioned in approximately the middle of the length of the balance weight 34. The balance shaft 26 rotates around its central axis 36. The balance weight 34 is semi-circular in shape, which is shown more clearly in FIGS. 2 and 3C.

Figure 3A:
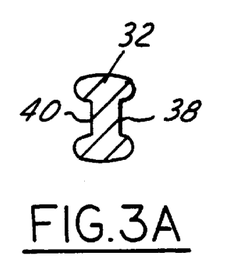
FIGS. 3A, 3B and 3C are cross-sectional views of the balance shaft shown in FIG. 3, the cross-sectional views being taken along lines 3A—3A, 3B—3B and 3C—3C, respectively, in FIG. 3 and in the direction of the arrows.
Figure 3B:
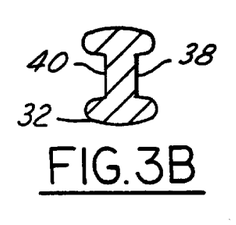

The connector portion 32 has a pair of recesses or channels 38 and 40 on opposite sides thereof. The recesses 38 and 40 significantly reduce the overall weight of the balance shaft 26 without significantly sacrificing strength or stiffness of the balance shaft. FIGS. 3A, 3B and 3C show the cross-sectional size and shape of the connector portion 32 at various positions along its length. Alternatively, if desired, only one recess could be provided in the connector portion.

Figure 5:
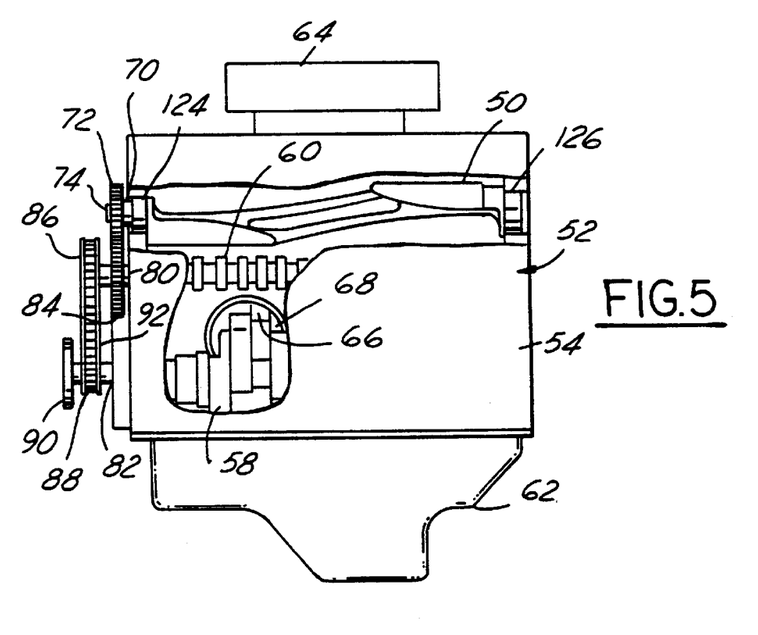
FIG. 5 is a side elevational view of an automobile engine incorporating a rotating couple-type balance shaft in accordance with the present invention.
Figure 6:
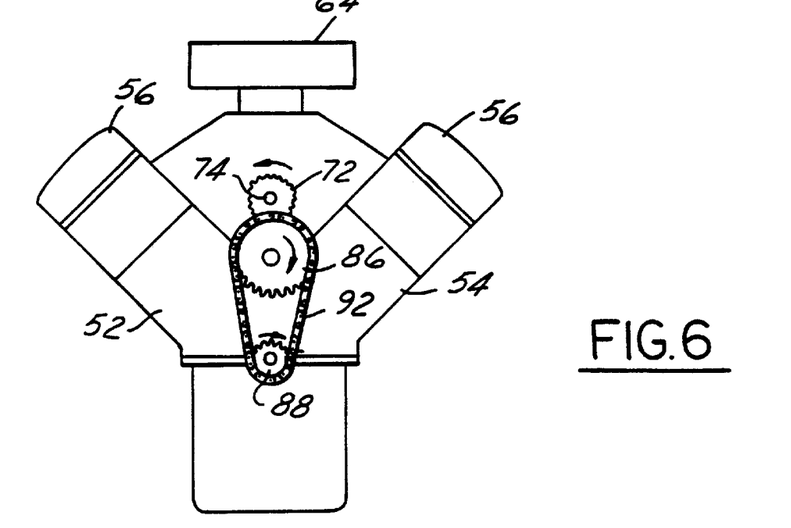
FIG. 6 is a front elevational view of the engine shown in FIG. 5.

Another embodiment of the invention relates to rotating couple-type balance shafts which are used to reduce or cancel vibration and/or shaking forces caused by certain engines, such as the V-6 engine 52 shown in FIGS. 5 and 6. Engine 52 is a 90-degree V-6 engine. These engines, due to their structure and geometry, produce an imbalance couple which rotates in the opposite direction of the crankshaft, and can thus significantly benefit from a counter-rotating balance shaft of the rotating couple-type. The couple produced by the balance shaft is designed to oppose or cancel that of the engine when the balance shaft is rotating at crankshaft speed and in the opposite direction.

The inventive balance shaft is generally indicated by the numeral 50 in the drawings. The engine 52, in which the balance shaft 50 is situated, generally comprises a cylinder block 54, a pair of cylinder heads 56, a crankshaft 58, a cam shaft 60, an oil pan 62 and an air cleaner 64. A plurality of pistons 66 are positioned in cylinders 68 and connected to the crankshaft.

A nose or drive shaft 70 on the balance shaft 50 protrudes outside the front of the cylinder block 54 and has a drive gear or sprocket 72 attached to it. The gear 72 is attached in any conventional manner, such as bolt 74. Gear 72 is also oriented to the drive shaft 70 by a slot and key mechanism (not shown) or by any other conventional means.

The camshaft 60 and crankshaft 58 also have noses or drive shafts 80 and 82, respectively, which protrude outside the front of the cylinder block 54. Nose 80 of camshaft 60 is secured to drive gear 84 and sprocket 86. The nose 82 of crankshaft 58 is secured to drive sprocket 88. A vibration damper 90 is also preferably attached to the nose 82 of the crankshaft 58. Sprockets 86 and 88 are connected by a conventional drive chain or toothed timing belt 92. Drive gear 84 is meshed with gear 72 on the balance shaft 50.

Sprockets 86 and 88 are both rotated in the same direction by the drive chain or toothed timing belt 92, as shown in FIG. 6. The respective sizes and diameters of sprockets 86 and 88 are such that the crankshaft 58 rotates at twice the speed of the camshaft 60.

The meshing of gears 72 and 84 causes the balance shaft 50 to rotate in a direction opposite to that of the crankshaft and thus counterbalance the vibrations caused by the engine 52. The size and diameters of the gears 84 and 72 determine the rotational speed of the balance shaft 50. Typically, shaft 50 is rotated at twice the speed of the camshaft 60, and the same speed as the crankshaft 58.

Figure 7:
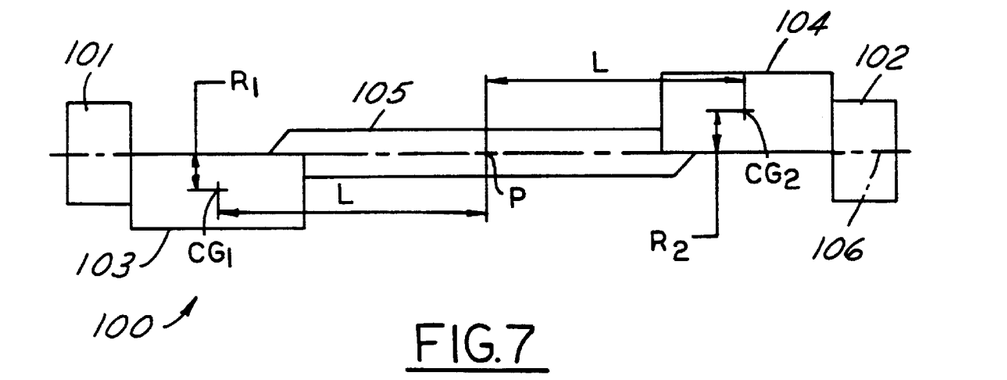
FIGS. 7 and 8 depict schematic diagrams of a typical rotating couple-type balance shaft illustrating the weights, forces and moments associated therewith.
Figure 8:
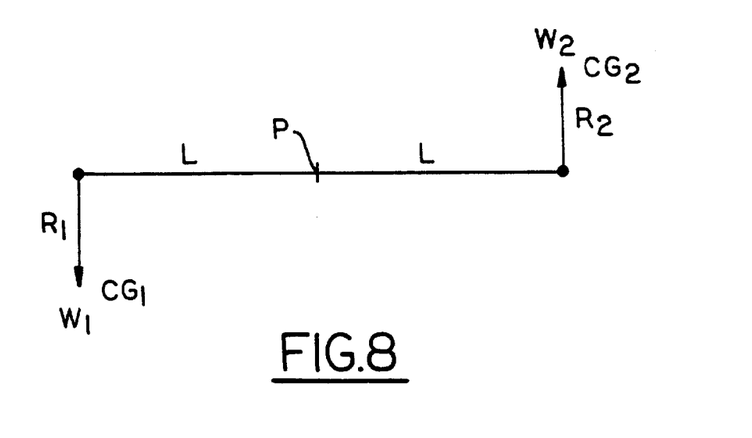

The shape and characteristics of a conventional rotating couple-type balance shaft are shown schematically in FIGS. 7 and 8. As shown in FIG. 7, the balance shaft 100 has a pair of bearing surfaces 101 and 102, a pair of balance weights 103 and 104 and a connector portion 105. The balance weights 103 and 104 have centers of gravity "$CG_1$" and "$CG_2$", respectively, at the points shown. The balance shaft 100 rotates about a central longitudinal axis 106. As shown, the balance weights 103 and 104 are on opposite sides of the axis 106. The cross-sectional shapes of the balance weights 103 and 104 can be of any cross-section, but typically are "circular segment" shaped, where the straight inside edge of the weight represents constant contribution to unbalance within the section.

The balance shaft's unbalance couple "$C_u$", required to offset that of the engine is based on the masses and geometry of the engine. This is calculated by conventional methods known in the art. The unbalance couple can be expressed by the equation $$C_u = LR_1W_1 + LR_2W_2 \tag{1}$$

where L is one-half the length or distance between the centers of gravity $CG_1$–$CG_2$ of the balance weights, $R_1$ and $R_2$ are the distances from the axis of rotation 106 to the centers of gravity of the balance weights, and $W_1$ and $W_2$ are the masses or weights of the balance weights. These distances and weights are expressed in the diagram shown in FIG. 8.

When the engine is designed, the dimensions of the cavity for placement of the balance shaft are determined. In this regard, the length between the bearings which house the bearing surfaces 101 and 102 is determined, together with the clearance boundary radius/radii of the balance shaft. The shape and configuration of the balance shaft is constrained within these boundaries. As a result, in accordance with equation (1) set forth above, if it is desired to decrease the weights W of the balance weights, then the distances L or R can vary to the extent permitted by the boundary conditions in order to meet the requisite couple $C_u$ for the engine.

Figure 9:
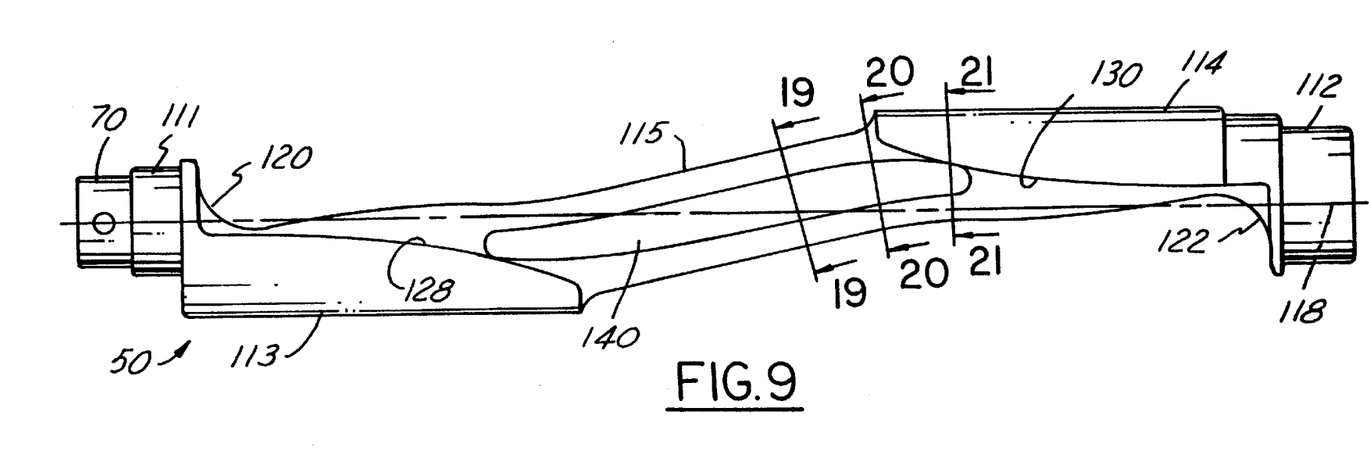
FIG. 9 is a side elevational view of a rotating couple-type balance shaft in accordance with the present invention.
Figure 10:
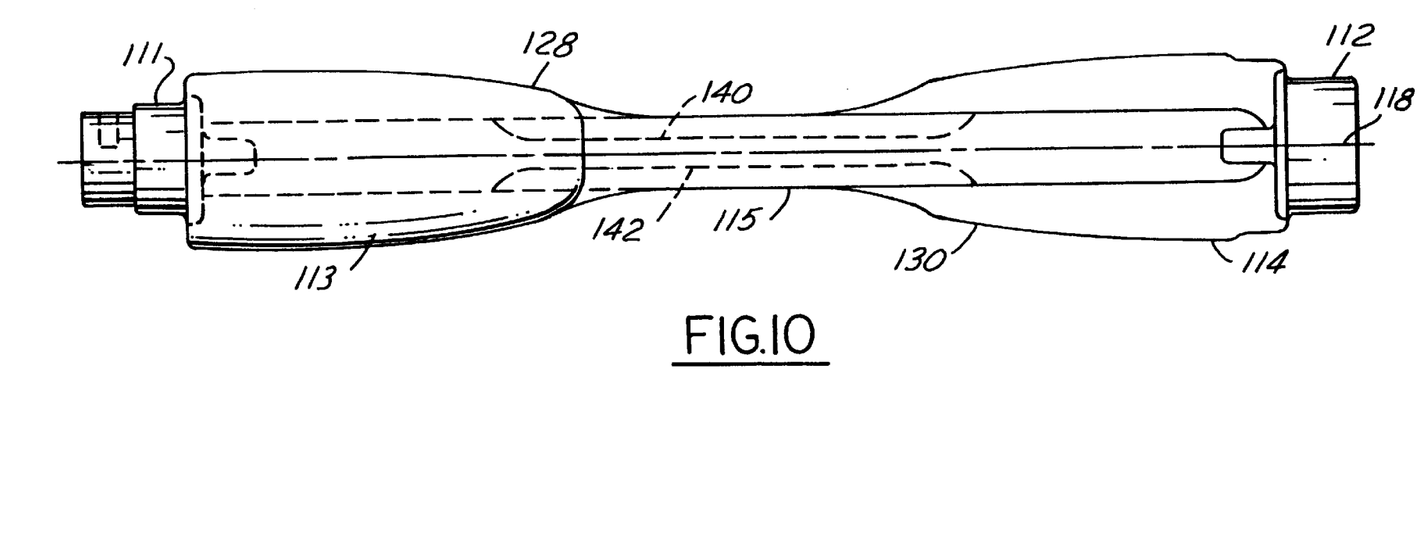
FIG. 10 is a bottom elevational view of the rotating couple-type balance shaft as shown in FIG. 9.

A rotating couple-type balance shaft 50 made in accordance with the present invention is shown in FIGS. 9 and 10. The balance shaft 50 has a pair of bearing surfaces 111 and 112, a pair of balance weights 113 and 114 and a central connector portion 115 which extends between the balance weights. The balance shaft rotates about a longitudinal axis 118.

The balance weights 113 and 114 may have curved or straight gusset portions 120 and 122 which are used to integrally connect the balance weights to the bearing surfaces 111 and 112, respectively. These add strength to the structure.

Surfaces 111 and 112 on the ends of the balance shaft are manufactured in order to allow proper fitting in bearings 124 and 126, respectively, in the engine (as shown in FIG. 5). When the balance shaft 50 is mounted in the engine 52, bearings 124 and 126 are positioned to allow the balance shaft to rotate freely. The nose 70 of the balance shaft 50 is positioned at one end of the balance shaft and is configured to extend outside the cylinder block 54 and be connected to the drive gear 72, as discussed above. As indicated earlier, the drive gear 72 rotates the balance shaft 50 in the direction and at the speed desired for the engine.

Although the drawings and above description disclose that the balance shaft is mounted in the engine by bearings positioned at the two ends of the balance shaft, it is also possible to position the bearings at intermediate positions spaced from the ends of the shaft, for example within the length of the balance weights. Further, more or less than two bearings can be provided.

Surface 128 of balance weight 113 and surface 130 of balance weight 114 are manufactured to have a curved surface. As shown in FIG. 10, the curves of the surfaces 128 and 130 also allow the sides of the balance weights 113 and 114 to form curves which taper from the bearing surfaces 111 and 112 toward the connector portion 115.

Figure 11:
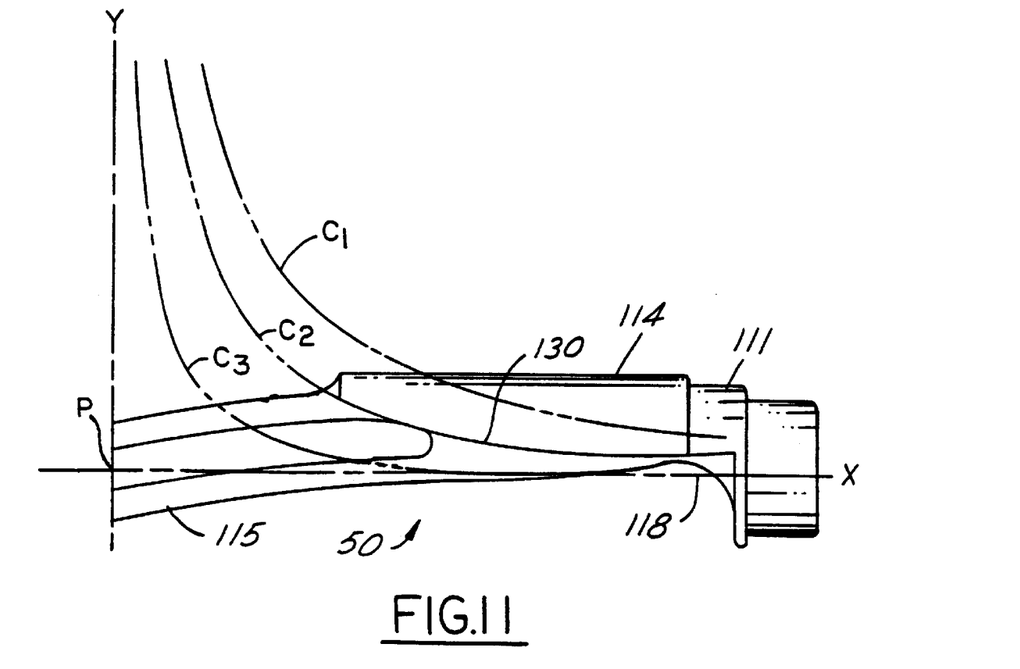
FIG. 11 illustrates a manner in which the hyperbolic shape of the curved surfaces can be determined for the balance weights for a rotating couple-type balance shaft in accordance with the present invention.

In accordance with the present invention, the surfaces 128 and 130 are formed as hyperbolic curves, or approximations of hyperbolic curves. This feature is better shown in FIG. 11. In that Figure, one half of balance shaft 50 is shown superimposed on an X-Y grid. The axis of rotation 118 of the balance shaft is aligned along the X-axis, and the intersection of the X and Y axes is positioned at the center P of the couple. As shown, the curve of the surface 130 of balance weight 114 is formed along a hyperbola in accordance with the equation:

$$(X) \times (Y) = C \qquad (2)$$

The desired output of the rotating couple-type shaft is a pure couple of specific magnitude. This output requires that both unbalances $(R_1) \times (W_1)$ and $(R_2) \times (W_2)$ be equal, or a couple plus a residual unbalance will result. Thus the "half moment" distance L can be defined, in simplification (for purposes of discussion and as shown in FIGS. 7 and 8) of the more general equations summing forces and moments, as also equal for each side, namely the axial distance from one CG to point P midway between the CG's.

Disregarding, also for purposes of simplifying the discussion, the unbalance contributions due to connector portions, gussets, and the like, it may be seen that the contribution to the magnitude of the rotating unbalance couple made by any element of mass within the balance weight is a function of that element's location, specifically the product of its axial distance from the centerline of the unbalance couple and its radial distance from the shaft's rotational centerline, when viewed normal to the plane of the unbalance couple as in FIGS. 7, 9 and 11. From this, it can be seen that locations with an $(X) \times (Y)$ product greater than a reference value "C" represent more efficient use of material than locations having lesser products. Therefore, in order to secure mass reduction for balance shafts of the rotating couple-type in accordance with the present invention, mass (balance weight material not dedicated to structural purposes such as connector portions, gussets and the like) is relocated from low $(X) \times (Y)$ product locations to more efficient locations having products greater than or equal to a reference value "C".

Figure 12:
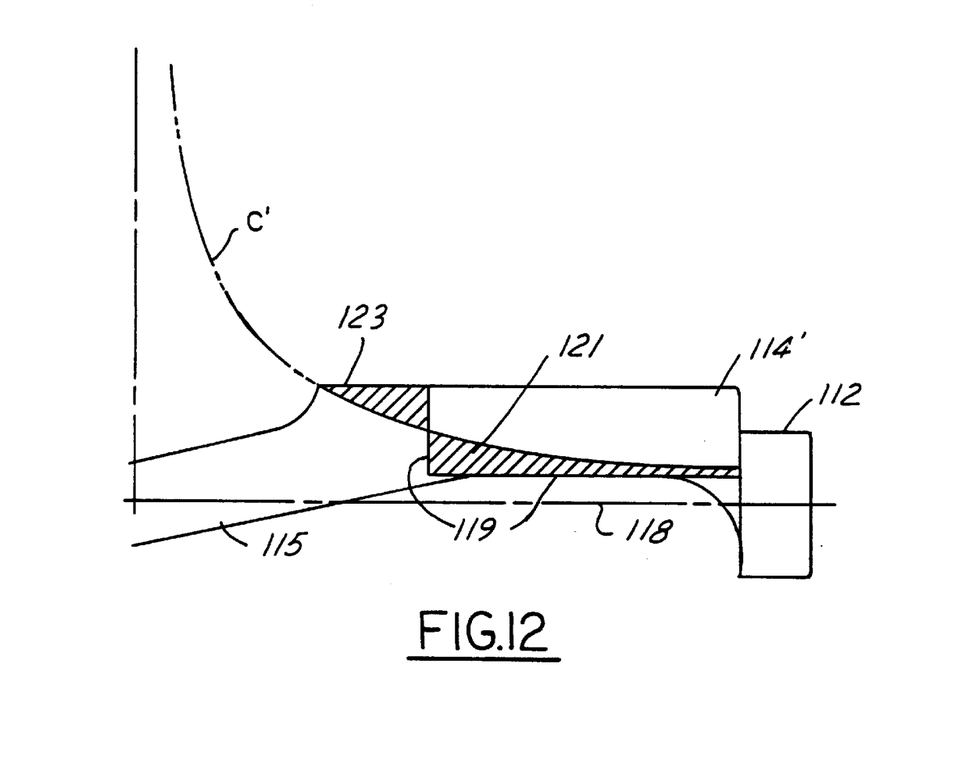
FIG. 12 illustrates the relocation of inefficient mass on a balance shaft to make it efficient in accordance with the present invention.

A general representation of this relocation is shown in FIG. 12. In that Figure, the profile of a typical rectangular counterweight 114' is indicated by the reference numeral 119. The balance shaft rotates around axis 118 and has a connector portion 115. The inefficient portion 121 of the counterweight mass is situated below the envelope or area defined by hyperbolic curve C'. In accordance with the present invention, the inefficient mass portion 121 is effectively relocated to position 123 above the hyperbolic curve C' on the balance shaft in order to provide the required unbalance moment with less material.

The preferred mode for the present invention for rotating couple-type shafts is to add or subtract material uniformly along the full length of the side elevation hyperbolic surfaces defined by the equation $(X) \times (Y) = C$, or $Y = C/X$. The value of C is adjusted until the target unbalance couple magnitude is reached and after a full utilization of the clearance boundary radius/radii has been made.

In cases where a single radius defines the clearance boundary envelope, the balance shaft will be symmetrical (except for the effects of differences in features dedicated to structural purposes), having common C value for both of the balance weights. Where clearance boundary conditions differ, i.e., where multiple radii define different envelope sizes or shapes for the two balance weights, mass optimization will involve use of differing values for C in order to equate $(R) \times (W)$ unbalances between the two balance weights. The differing C values will result in differing CG locations, thus influencing the distance between CG's, and hence the value of distance L, which is a determinant in the unbalance moment's magnitude. In this case of differing boundary conditions, it will be necessary to determine the distinctly different C values that will provide for the target unbalance couple magnitude while fully utilizing the clearance boundary envelope, in order to avoid any residual unbalance which would result from unequal $(R) \times (W)$ unbalance values.

Figure 13:
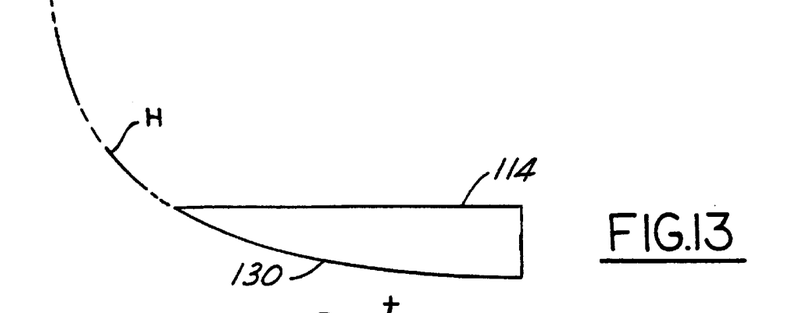
FIGS. 13–18 illustrate alternate embodiments of balance weights in accordance with the present invention.

It is preferred that the shape of the surface 130 be a curve of a true hyperbola (as shown in FIGS. 11 and 13). In FIG. 13, the hyperbolic shape is shown by phantom line H which is a continuation of the curve which forms surface 130 on balance weight 114.

Figure 14:
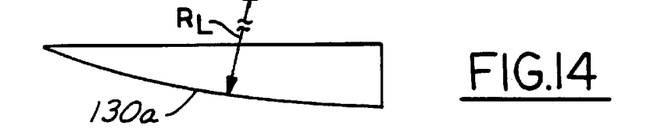
Figure 15:
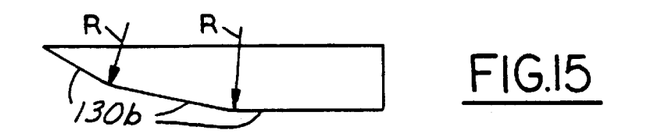

It is also possible in accordance with the present invention, however, for the surface 130 to have a shape that is a reasonable approximation of a hyperbolic curve. Examples of these are shown in FIGS. 14–18. For example, as shown in FIG. 14, the surface 130a has a generally curved surface. Surface 130a is formed as part of a large circle having radius RL. In FIG. 15, a series of straight line segments 130b are used to approximate the hyperbolic shape. In this regard, although three straight line segments are shown in FIG. 15 approximating a hyperbolic curve, it is understood that any number of straight line segments could be utilized.

Figure 16:
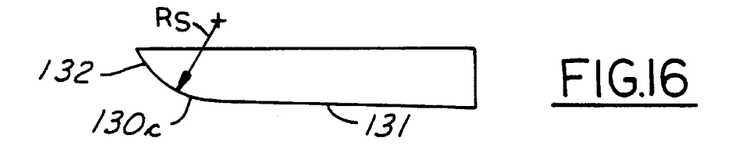
Figure 17:
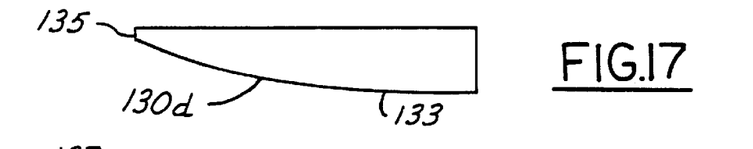

In FIG. 16, the curved surface 130c is formed from a combination of a straight line 131 and a curved line 132. In this regard, the curved portion 132 is formed as a part of a small circle having radius $R_s$. As shown in FIG. 17, the curved surface 130d is formed as a truncated hyperbola 133 with a blunt end portion 135. Also, in FIG. 18, the hyperbolic curve is approximated by a series of straight lines 130e and has a truncated or blunt end 137. It is understood that the blunt end portion 137 can be used with any of the previous contour variations. A blunt end 137 can be provided, for example, due to manufacturing and/or design considerations.

Moreover, it is also possible that the shape of surface 130 could be a portion of another geometric figure, such as a portion of a parabola or an ellipse, and still constitute a reasonable approximation of a hyperbolic curve or shape.

As stated above, in accordance with the present invention, the curved shape of the balance weight allows the product of the length L which extends from couple midpoint P to the centers of gravity $CG_1$ and $CG_2$ of the balance weights and the radii $R_1$ and $R_2$ to the CG's (see FIGS. 7 and 8), to be maximized by means of material distribution along the hyperbolic surface 130, thus avoiding inefficiently located material which would fall below the threshold of "equal efficiency," i.e., having constant contribution to unbalance. (This is shown in FIG. 12 where the curve is designated by the letter C'.) This in turn allows the mass or weight W of the balance weights to be minimized.

The particular curve actually utilized for the balance weights of the balance shaft, such as curve $C_2$ which forms surface 130 in FIG. 11, is selected in accordance with the length and weight parameters afforded by the engine's clearance envelope and the correcting couple needed. In this regard, as shown in FIG. 11, a balance weight having a curved surface along curve $C_1$ would provide a lower unbalance moment, while curve $C_3$ a greater unbalance moment, than curve $C_2$. The needed unbalance couple is thus obtained by means of the appropriate value(s) for constant C, thus avoiding unnecessary weight or mass.

Figures 18, 19, 20, 21:
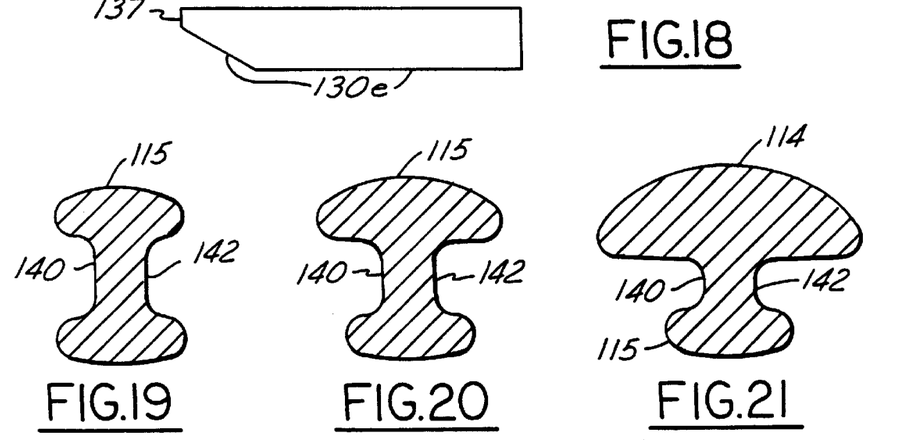
FIGS. 19–21 are cross-sectional views of the balance shaft shown in FIG. 9, the cross-sectional views being taken along the lines 19—19, 20—20 and 21—21, respectively, in FIG. 9 and in the direction of the arrows.

Also in accordance with the present invention, the cross-sectional size and shape of the connector portion 115 is optimized for given load conditions in order to minimize its mass and thus the weight of the balance shaft 50. FIGS. 19, 20 and 21 illustrate a preferred shape of the connector portion 115 of the balance shaft 50 shown in FIGS. 9 and 10.

As shown in FIGS. 19–21, the sides 140 and 142 of the connector portion 115 are recessed or shaped in a concave manner. This lightens or reduces the weight of the balance shaft without significantly reducing its resistance to bending in the plane of balance weight centrifugal loading. Essentially, the cross-sectional shape of the connector portion 115 has a generally "I-beam" shape. This maximizes the section modulus in the direction of the centrifugal loads. This in turn minimizes the peak stress for a given amount of material usage. Alternatively, only one recess could be provided in the connector portion.

FIG. 21 shows a cross-sectional view of the balance shaft 50 including a portion of the connector portion 115 and a portion of the balance weight 114. As shown, the weight or mass of the balance shaft is distributed over a wider area to maintain section modulus and avoid stress concentrations. It is clear that other cross-sectional shapes and proportions for the connector portions 115 and transition areas to the balance weights 114 can be utilized in accordance with the present invention.

FIGS. 22–27 illustrate additional embodiments of static unbalance-type balance shafts in accordance with the present invention. In two of these embodiments, the inner surfaces of the balance weights have a hyperbolic shape or a reasonable approximation thereof, for efficient mass usage, while in all cases the connector portions preferably are essentially "I-beam" shapes for bending stiffness maximization. The bearing journals also preferably have small ideally-sized diameters to minimize friction while assuring reliability.

Figure 22:
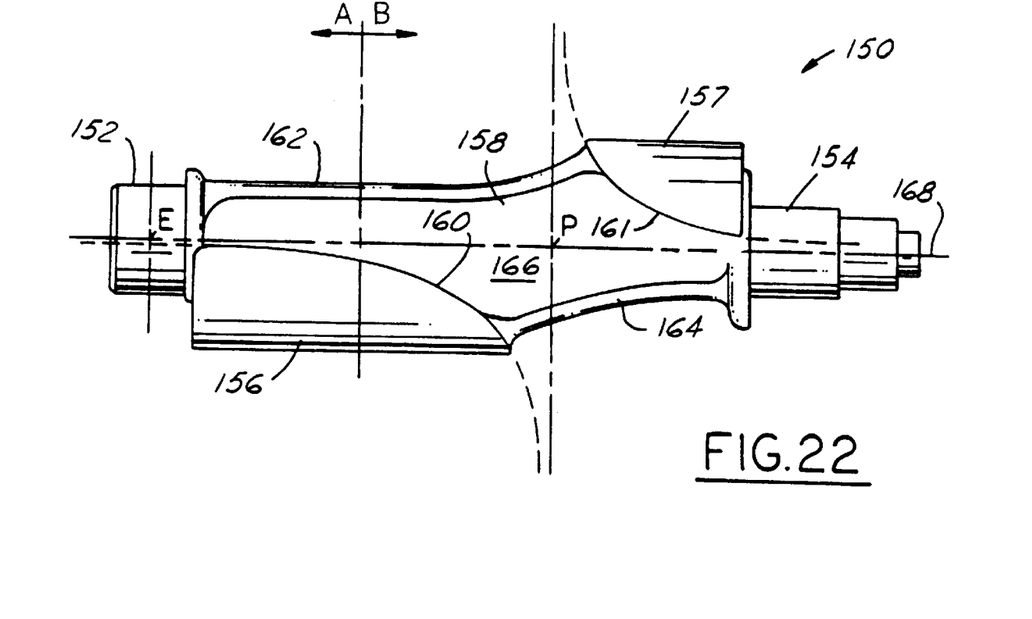
FIG. 22 illustrates a two-journal static unbalance-type balance shaft suitable for axial assembly, with hyperbolic shaped balance weights to create dynamic unbalance with minimal additional weight, so as to produce an EPSUB at or near its left-hand journal.
Figure 23:
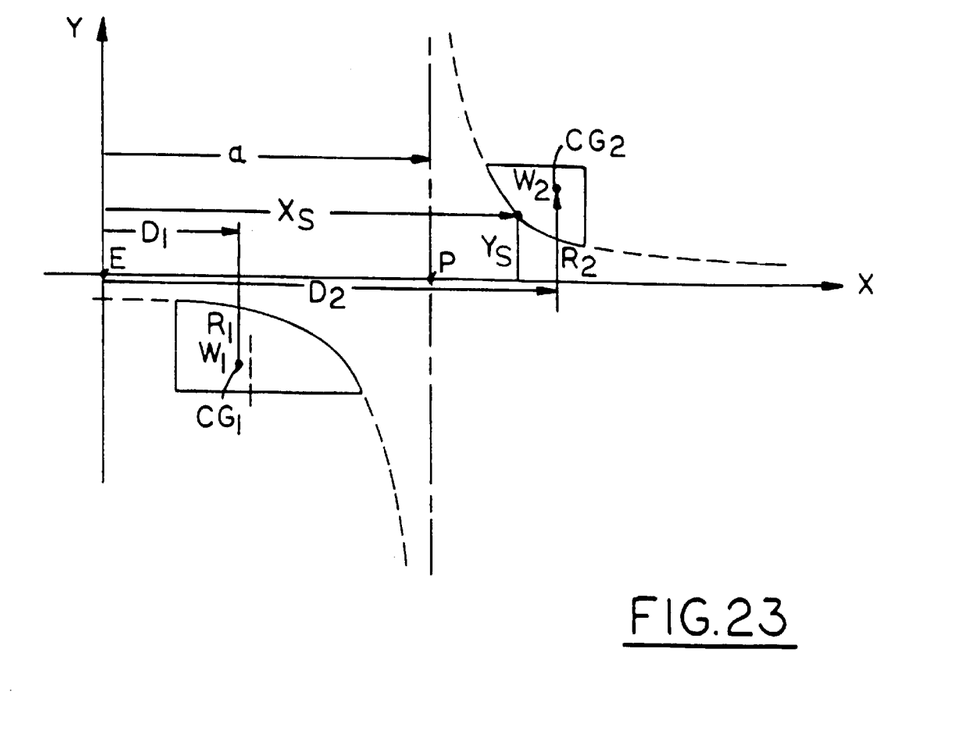
FIG. 23 is a diagram showing how to configure the balance weights of the balance shaft embodiment of FIG. 22 to achieve the benefits thereof.

In the embodiment shown in FIG. 22, a balance shaft 150 is provided which is an improvement over known single unbalance-type balance shafts. The balance shaft 150 has a pair of journal members 152 and 154, a large balance weight 156, a small unbalance weight 157, and a connector portion 158. The balance weights 156 and 157 have surfaces 160 and 161 respectively which are formed in the shape of a hyperbolic curve or a reasonable approximation thereof. These shapes are the same as those on the hyperbolically-shaped balance shafts discussed above with respect to the rotating couple-type balance shafts. Such shaped balance weights minimize mass and the cost of adding dynamic unbalance to the balance shaft in order to relocate the EPSUB and thus avoid the complications inherent to the need to distribute unbalance mass on both sides of an ideally sized principal (engine center bulkhead area) bearing journal. The hyperbolic surfaces may be defined by the relationship $$Y_s = C/(X_s - a)$$

as illustrated in FIG. 23, where variable "$X_s$" and constant "a" originate from the EPSUB location "E" where the sum of unbalance moments equals zero, or in other words only the (residual) static unbalance force can be seen to act. "C" is a constant which is adjusted as defined above to achieve a target magnitude for the dynamic unbalance couple. "P" is the axial location of the centerline of the "pure couple," or dynamic unbalance, while EPSUB location "E" is the axial location where $$\Sigma M_E = 0 = (D_1 R_1 W_1 + D_2 R_2 W_2).$$

Summing unbalance reactions will show that the magnitude of the (residual) static unbalance, which remains after the cancellation effects of the opposed dynamic unbalance weights, is the difference between individual balance weight unbalances (neglecting, for purposes of discussion simplicity, the effects of connector portions and the like), or $R_1 W_1 - R_2 W_2$. It will also be the difference between bearing reaction forces.

The connector portion 158 has essentially an "I-beam" shape with top and bottom thick ridge portions 162 and 164, respectively, separated by recessed or reduced portions 166. This shape maximizes the bending stiffness of the balance shaft 150.

The two journals 152 and 154 each have diameters optimized for bearing reliability and friction minimization. Their external location enables the manufacturing cost benefits of axial assembly with non-split housing type bearings. The two journals are preferably located in, or adjacent to, the front and central bulkheads of the engine (or, alternatively, in, or adjacent to, the rear and central bulkheads), thus potentially an advantage to meeting space constraints.

The close proximity of the static unbalance portion of the main counterweight to the central bulkhead where the principal vertical shaking forces are to be applied, allows for the "rotating couple" portion of the counterweight to be of reasonable proportions. In this regard, the portion of the balance shaft 150 which is designated by the letter "A" may be considered to act as the "static unbalance" portion, while the portion which is designated by the letter "B," the "pure rotating couple" or dynamic unbalance portion. This "breaking down" of unbalance regions for purposes of visualization has no overall effect on the summing of moments and forces (besides increasing computation time) and serves no perceived computational purpose, but may facilitate understanding of the ability of dynamic unbalance to relocate the EPSUB.

Figure 24:
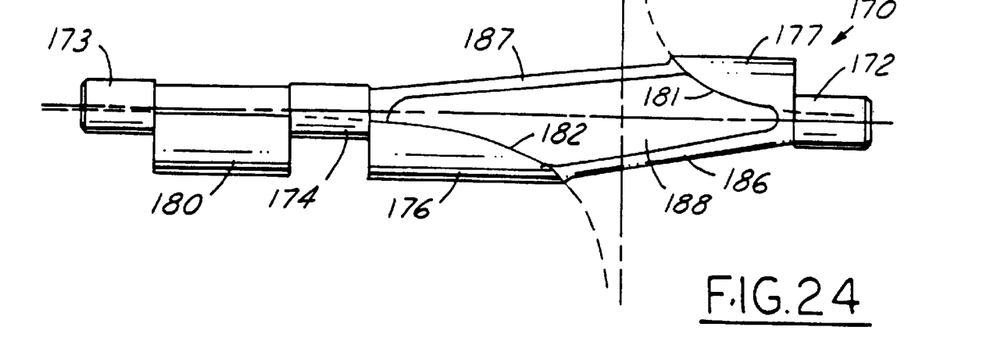
FIGS. 24–28 illustrate additional embodiments of static unbalance-type balance shafts with overhung configurations, one having a third support journal member similar to that of FIG. 3, and with FIG. 26 being a cross-sectional view of the balance shaft shown in FIG. 25, the cross-sectional view being taken along line 26—26 in FIG. 25 and in the direction of the arrows.

FIG. 24 illustrates a static unbalance-type balance shaft 170 similar to the embodiment shown in FIG. 22, but with a third journal located in the region of the principal counterweight. The balance shaft 170 also has a primary balance weight 176, a secondary balance weight 177, a connector portion 178, and a third balance weight 180. Balance weight 176 has a surface 182 which has a substantially hyperbolic shape. The secondary balance weight 177 also preferably has a surface 181 which has a substantially hyperbolic shape. Similarly, the third balance weight 180 has a surface 184 which also preferably has a curved substantially hyperbolic shape. In this regard, the shape of the surfaces 182 and 184, together take the form of a single hyperbolic curve, that is, surface 184 is an extension of the surface 182 and a continuation of the same curve.

The connector portion 178 has a substantially "I-beam" shape, with a pair of enlarged ridge or flange members 186 and 187 and a central recessed web member 188.

Figure 25:
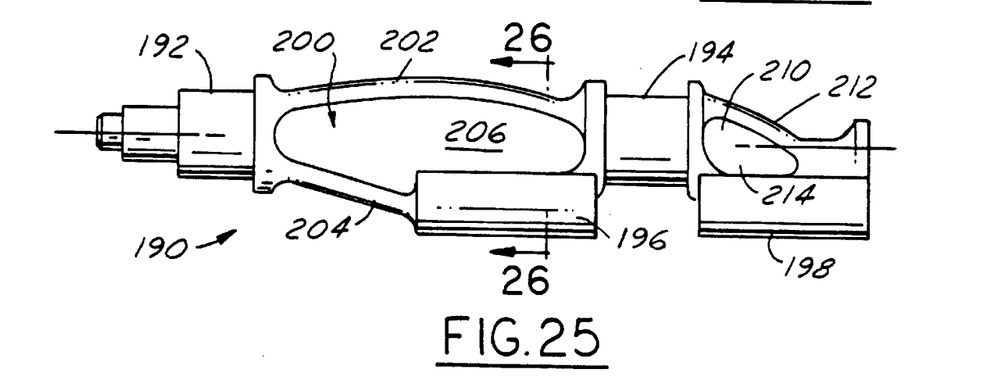

FIGS. 25–28 illustrate still additional embodiments of static unbalance-type balance shafts in accordance with the present invention. In FIG. 25, the balance shaft 190 has a pair of journal members 192 and 194, a main balance weight 196 positioned between the journal members, and a second overhung balance weight 198 which extends on the other side of the second journal member 194. An I-beam shaped connector member 200 connects the main balance weight to the first journal member 192, while providing bending stiffness in the region of the balance weight. A second I-beam shaped structural member 210 connects the second balance weight 198 to the second journal member 194 with high stiffness.

Connection member 200 has a pair of ridge or flange members 202 and 204, as well as a central recessed web member 206. The second structural member 210 has a flange member 212 and a recessed central web member 214. As shown in FIG. 25 preferably ridge members 202 and 212 of the connector member 200 and 210, respectively, are curved in the longitudinal direction. As shown in the FIG. 26 cross-section, the upper flange of the connector member 200 is also preferably configured to terminate adjacent to the journal member 192 with largely overlapping sections, so as to maximize structural integrity. The I-beam cross sections of the connector member reduces mass while maintaining high stiffness to bending in the direction of the unbalance loads.

Figure 26:
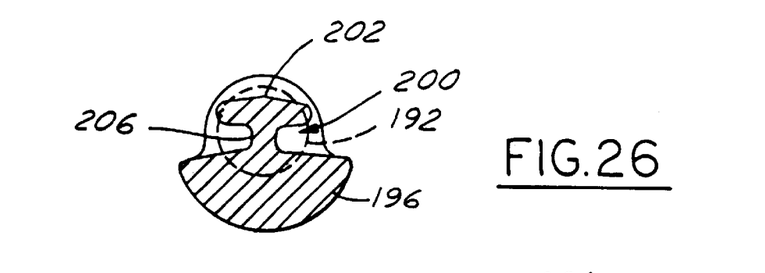
Figure 27:
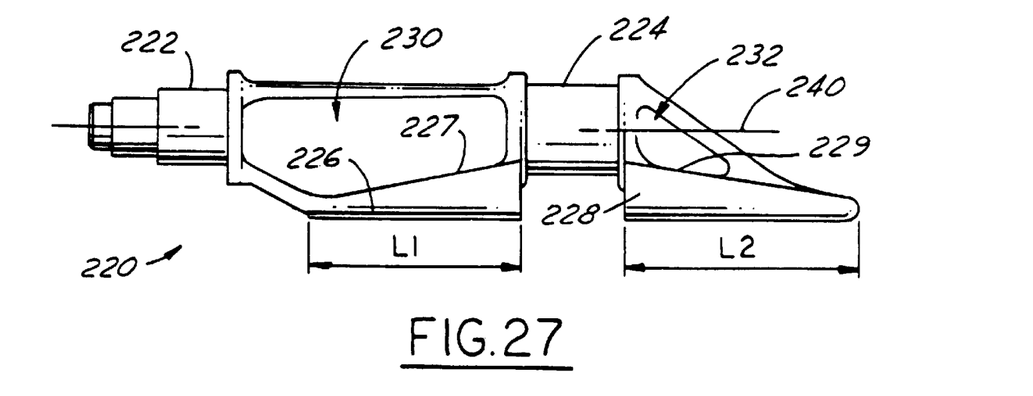

In the embodiment shown in FIG. 27, the balance shaft 220 is similar to the shaft 190 shown in FIGS. 25 and 26. The balance shaft 220 has a pair of journal members 222 and 224, a main balance weight 226 positioned between the journal members, an overhung balance weight 228, a first connector portion 230 connecting the main balance weight 226 to the journal members, and a second connector portion 232 connecting the overhung balance weight 228 to the journal member 224. The connector portion 230 has an I-beam shaped cross-sections similar to those described above with reference to FIGS. 22–26.

The surfaces 227 and 229 of balance weight, 226 and 228, respectively, are tapered in the longitudinal direction of the balance shaft, as shown in FIG. 27. These configurations have less mass than the rectangular configurations of the balance weights 196 and 198 in FIG. 25 at the same unbalance values, and at the same time maintain solid structural connections to the journal 224. The axial lengths L1 and L2 of the balance weights 226 and 228 are also greater than the corresponding lengths of the balance weights 196 and 198 in the FIG. 25 embodiment.

The elongation of the more effective (toward unbalance creation) outer portion (near clearance boundary radius, when viewed normal to direction of unbalance and axis of rotation) of the balance weights in conjunction with longitudinal tapering of the inner surfaces to maintain equivalent unbalance value serves to reduce mass, while increasing bending stiffness, in the case of the balance weight(s) between journals, and while potentially reducing bearing journal tilt under high speed unbalance loads of the "outrigger" bearing and its adjacent drive means, in the case of the overhung balance weight. To the extent that the moment of unbalance, about the length centerline of the principal bearing, of the overhung balance weight exceeds that of the balance weight between support bearings, the principal bearing is used as a fulcrum to offset the bending deflection of the shaft between bearings, under high speed operating loads, to the potential straightening of the outrigger journal and its adjacent drive means, which can be of critical importance in the maintenance of the theoretical, or undeflected, helical contact ratio of drive gears and/or coupling gears as required for quiet operation.

Journal tilt magnitudes are also a design consideration in the optimization of support bearings, with plain, or journal-type bearings especially susceptible to edge loading which is a principal cause of seizure failures.

Figure 28:
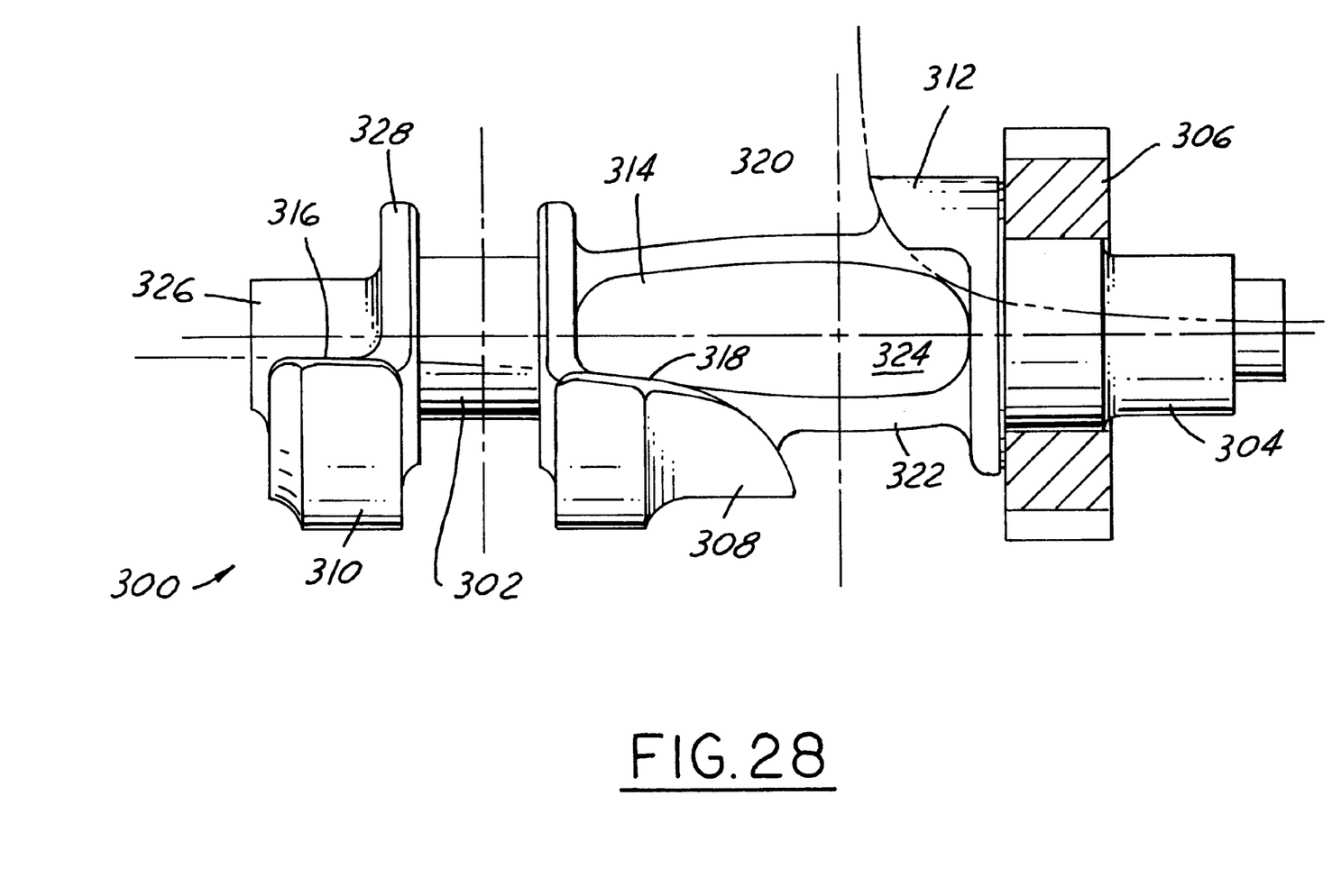

In FIG. 28, the balance shaft 300 has a pair of journal members 302 and 304 a gear journal member 306, a main (or middle) balance weight 308 positioned between the journal members adjacent journal member 302, a second overhung balance weight 310 which extends on the other side of journal member 302, and a third (or "couple") balance weight 312 between the journal members adjacent gear journal member 306. An I-beam shaped connector member 314 connects the main (or middle) balance weight 308 to the third (or couple) balance weight 312, while providing bending stiffness to unbalance loads. The connector member 314 has a pair of ridge or flange members 320 and 322, as well as a central recessed web member 324. Preferably, the connection member 314 has an I-beam cross-sectional shape. The second structural member 326 has a flange member 328. The upper flange 320 of the connector member 314 is preferably configured to terminate adjacent to the gear member 306 with largely overlapping sections, so as to maximize structural integrity. As in the case of FIG. 24, the elongated (substantially chordal, closest to the axis) surfaces of middle balance weight 308 and overhung balance weight 310 of the FIG. 28 embodiment preferably together take the form of a single hyperbolic curve, that is, surface 316 is an extension of surface 318 and a continuation of the same curve. Additionally, "couple" balance weight 312 utilizes the same hyperbolic formula constant "a" as balance weights 308 and 310 for efficient distribution of material not dedicated to other purposes.

This embodiment in FIG. 28 uses the addition of dynamic unbalance to both relocate the EPSUB to the best location attainable (within space constraints) for the application's noise, vibration and harshness (NVH) criteria for distribution among engine mounts of residual static shaking forces, and to further improve high speed operating shape of the shaft, especially in the vicinity of the gear journal 306. The third (or couple) balance weight, serves to counteract the bending deflection of the shaft between journals under high speed unbalance loads, and thus contributes to maintenance of helical, and thus total, contact ratios of the coupling gearset to assist quiet operation at high speeds as discussed above.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A static unbalanced balance shaft having an axis of rotation, a first bearing surface adjacent a first end, a second bearing surface adjacent the other end, a balance weight adjacent said first end, and a connector portion connecting said balance weight to said other end, said connector portion having a substantially I-beam shaped cross-section with two recessed surfaces located on opposite side of said axis of rotation.

2. A method of optimizing the mass of a static unbalanced balance shaft for a vehicle engine, said shaft having an axis of rotation, a first bearing surface adjacent a first end, a second bearing surface adjacent the other end, and a connector portion connecting said balance weight to said other end, said method comprising the steps of:

forming said connector portion in a substantially I-beam shape; and forming two recessed surfaces on said connector portion on opposing sides of said axis of rotation.

3. A static unbalanced balance shaft having a first bearing surface adjacent a first end, a second bearing surface adjacent to the other end, a first balance weight adjacent said first end, a second balance weight adjacent said other end and positioned entirely on the opposite side of the axis of shaft rotation from said first balance weight, said first balance weight being substantially larger than said second balance weight in order to relocate the effective plane of static unbalance (EPSUB) of said shaft toward said first bearing surface, and a connector portion extending between and overlapping said first and second balance weights, said connector portion having a substantially I-beam shaped cross-section.

4. The static unbalanced balance shaft as set forth in claim 3 wherein at least one of said first balance weight or said second balance weight has an elongated surface having substantially hyperbolic curve shape, said elongated surface extending in the direction of the longitudinal axis of said shaft.

5. The static unbalanced balance shaft as set forth in claim 4 wherein the shape of said hyperbolic curve is determined by the formula $$Y_s = C/(X_s - a)$$

where "$X_s$" is a variable originating from the EPSUB, "a" is a constant originating from the EPSUB, and "C" is a constant which is adjusted to achieve a target magnitude for the dynamic unbalance couple.

6. The static unbalanced balance shaft as set forth in claim 4 wherein at least one portion of one of said elongated surfaces comprises a curved portion with a constant radius.

7. A static unbalanced balance shaft having a longitudinal axis, a first bearing surface adjacent a first end, a second bearing surface adjacent a second end, a first balance weight adjacent said first end, a second balance weight adjacent said second end, and a connector portion extending between said first and second balance weights, said second balance weight being positioned entirely on the opposite side of said longitudinal axis from said first balance weight, said first balance weight being substantially larger than said second balance weight at least one of said first balance weight or said second balance weight having a longitudinal elongated surface shaped substantially as a hyperbolic curve.

8. The static unbalanced balance shaft as set forth in claim 7 wherein said hyperbolic curve is determined by the formula $$Y_s = C/(X_s - a)$$

where "$X_s$" is a variable originating from the EPSUB, "a" is a constant originating from the EPSUB, and "c" is a constant which is adjusted to achieve a target magnitude for the dynamic unbalance couple.

9. The static unbalanced balance shaft as set forth in claim 7 wherein said connector portion overlaps said first and second balance weights and has a substantially I-beam cross-sectioned shape.

10. The static unbalanced balance shaft as set forth in claim 7 wherein at least one portion of one of said elongated surface comprises a curved portion with a constant radius.

* * * * *